US012738440B2

(12) United States Patent
Greenland et al.

(10) Patent No.: US 12,738,440 B2
(45) Date of Patent: Sep. 15, 2026

(54) X-RAY TUBE WITH STABLE ELECTRON BEAM

(71) Applicant: Moxtek, Inc., Orem, UT (US)

(72) Inventors: Kasey Otho Greenland, South Jordan, UT (US); Todd S. Parker, Kaysville, UT (US)

(73) Assignee: Moxtek, Inc., Orem, UT (US)

( * ) Notice: Subject to any disclaimer, the term of this patent is extended or adjusted under 35 U.S.C. 154(b) by 255 days.

(21) Appl. No.: 18/779,790

(22) Filed: Jul. 22, 2024

(65) Prior Publication Data

US 2025/0062094 A1 Feb. 20, 2025

Related U.S. Application Data

(60) Provisional application No. 63/519,937, filed on Aug. 16, 2023.

(51) Int. Cl.
*H01J 35/16* (2006.01)
*H01J 35/06* (2006.01)

(52) U.S. Cl.
CPC ............ *H01J 35/066* (2019.05); *H01J 35/16* (2013.01)

(58) Field of Classification Search
CPC .... H01J 35/066; H01J 35/16; H01J 2235/166; H01J 2235/168; H01J 35/06; H01J 35/045; H01J 35/08
See application file for complete search history.

(56) References Cited

U.S. PATENT DOCUMENTS

2016/0353562 A1* 12/2016 Antaya ................ H05H 13/005
2017/0287673 A1* 10/2017 Peterson ............... H01J 35/186

* cited by examiner

*Primary Examiner* — Uzma Alam
*Assistant Examiner* — Mamadou Faye
(74) *Attorney, Agent, or Firm* — Thorpe North & Western, LLP

(57) ABSTRACT

An x-ray tube can have a stable electron beam with resulting stable x-ray beam, reduced arcing failure of the x-ray tube, and reduced shielding mass. The x-ray tube can include a cathode and an anode electrically insulated from each other by a first enclosure and a second enclosure. A blocking disc can be located at or near a junction of the first enclosure and the second enclosure. A field-shaping cup can extend into a hollow region of the second enclosure. A low-Z-layer can be located on a side of the blocking disc that faces the electron emitter.

20 Claims, 2 Drawing Sheets

X-RAY TUBE WITH STABLE ELECTRON BEAM

CLAIM OF PRIORITY

This application claims priority to U.S. Provisional Patent Application No. 63/519,937, filed on Aug. 16, 2023, which is incorporated herein by reference.

FIELD OF THE INVENTION

The present application is related to x-ray sources.

BACKGROUND

X-rays have many uses, including imaging, x-ray fluorescence analysis, x-ray diffraction analysis, and electrostatic dissipation.

A large voltage between a cathode and an anode of the x-ray tube, and sometimes a heated filament, can cause electrons to emit from the cathode to the anode. The anode can include a target material. The target material can generate x-rays in response to impinging electrons from the cathode.

BRIEF DESCRIPTION OF THE DRAWINGS (DRAWINGS MIGHT NOT BE DRAWN TO SCALE)

Figure 1:
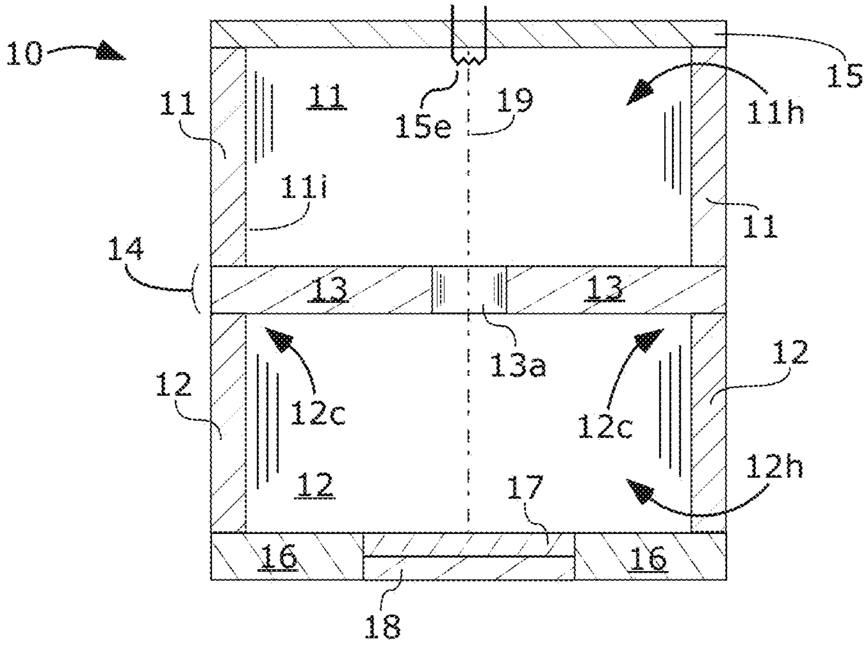

FIG. 1 is a cross-sectional side-view of an x-ray tube 10 with a cathode 15 and an anode 16 insulated from each other by a first enclosure 11 and a second enclosure 12. A blocking disc 13 can be located at a junction 14 between the first enclosure 11 and the second enclosure 12.

Figure 2:
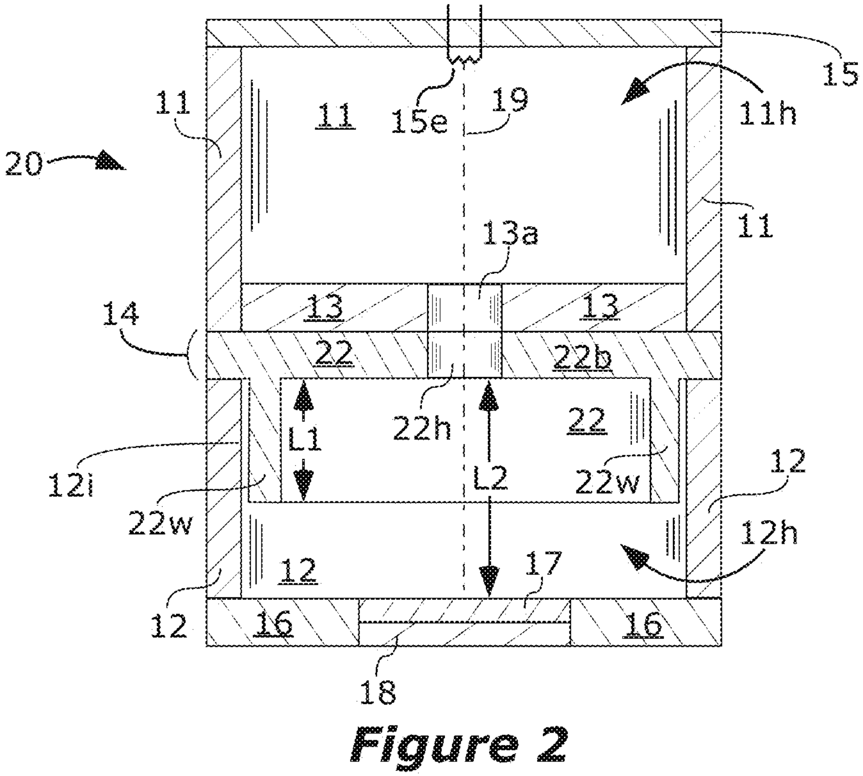

FIG. 2 is a cross-sectional side-view of an x-ray tube 20 with the features of x-ray tube 10, plus a field-shaping cup 22 located at least partially inside of the second enclosure 12.

Figure 3:
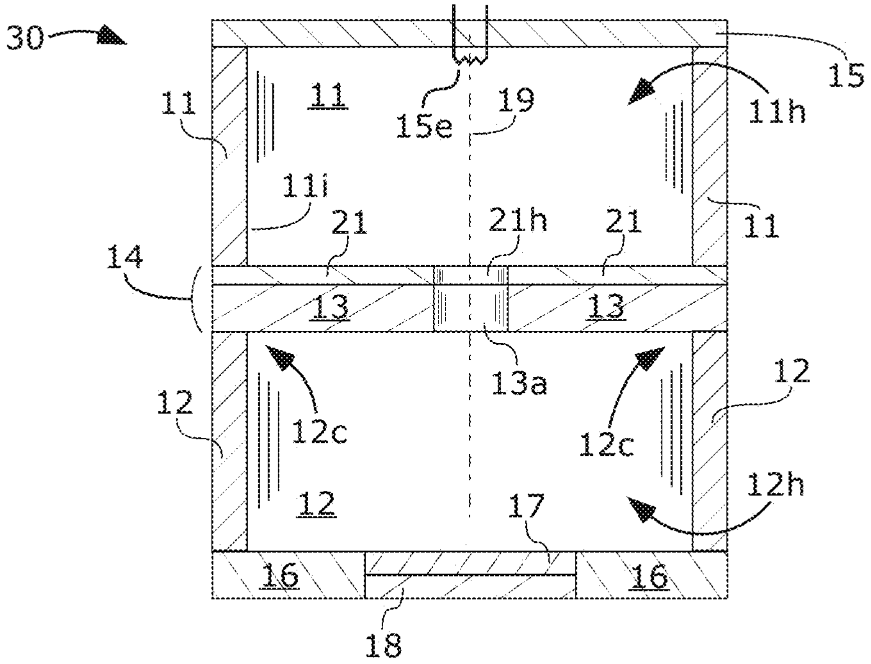

FIG. 3 is a cross-sectional side-view of an x-ray tube 30 with the features of x-ray tube 10, plus a low-Z-layer 21 on a side of the blocking disc 13 that faces the cathode 15.

Figure 4:
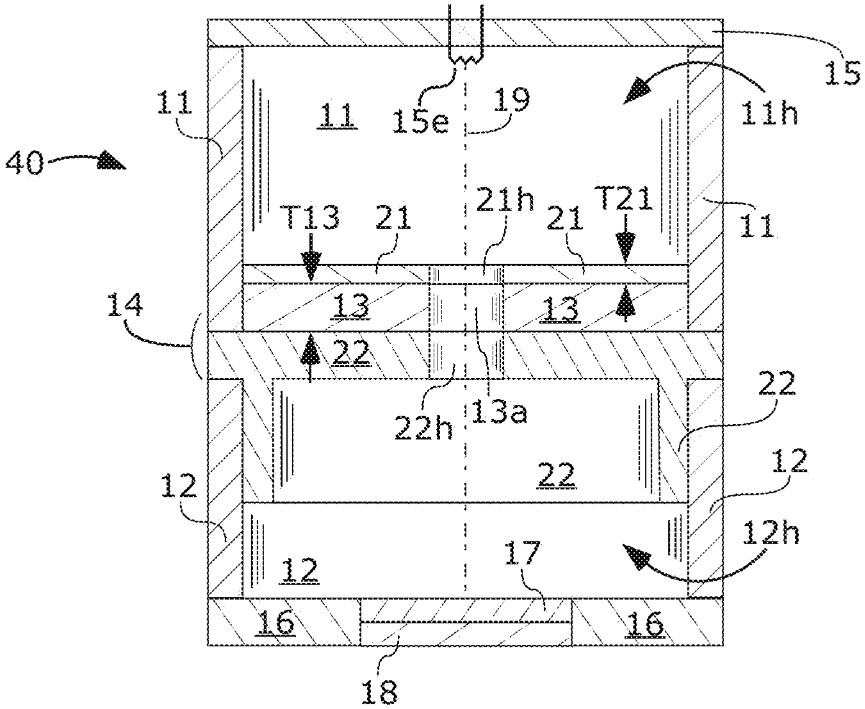

FIG. 4 is a cross-sectional side-view of an x-ray tube 40 with the features of x-ray tubes 20 and 30 combined.

Definitions. The following definitions, including plurals of the same, apply throughout this patent application.

As used herein, the terms "on", "located on", "located at", and "located over" mean located directly on or located over with some other solid material between. The terms "located directly on", "adjoin", "adjoins", and "adjoining" mean direct and immediate contact or only an adhesive or braze is located between the structures.

As used herein, the term "parallel" means exactly parallel; parallel within normal manufacturing tolerances; or almost exactly parallel, such that any deviation from exactly parallel would have negligible effect for ordinary use of the device.

As used herein, the term "x-ray tube" is not limited to tubular/cylindrical shaped devices. The term "tube" is used because this is the standard term used for x-ray emitting devices.

DETAILED DESCRIPTION

In an x-ray tube, a large voltage between a cathode and an anode, and sometimes a heated filament, can cause electrons to emit from the cathode to the anode. These electrons can hit a target at the anode, resulting in x-ray generation.

If the electron beam is unstable, then the x-ray flux will also be unstable. Electron beam instability can cause electron spot size and shape at the target to shift or change. Electron beam instability can also cause variable electron beam current. Shifting electron spot size or shape and variable electron beam current can cause problems for the x-ray tube user. A stable electron beam, with a resulting stable x-ray beam, is a useful feature of an x-ray tube.

Some electrons can hit the target, but fail to generate x-rays then rebound or backscatter. These backscattered electrons can collect on an electrically insulative surface inside of the x-ray tube. For example, these backscattered electrons can collect on an inner surface of a ceramic cylinder, which insulates the cathode from the anode. This collection of electrons can result in electron beam instability and/or early arcing failure of the x-ray tube. It would be helpful to reduce such electrons on the electrically insulative surfaces.

Some x-ray tubes are portable. A large x-ray tube weight can stress the user and is an ergonomic disadvantage. X-ray tubes require shielding of x-rays emitted in undesirable directions. High density material is typically used for such shielding, and therefore it can be heavy. It would be useful to reduce the mass of this shielding material.

An x-ray tube can have (a) a negatively-charged cathode and a grounded anode; (b) a positively-charged anode and a grounded cathode; or (c) a negatively-charged cathode, a positively-charged anode, and a grounded central region. X-ray tube style (c) is called a bipolar x-ray tube, and is used for very high voltages between the cathode and the anode. A bipolar x-ray tube is particularly susceptible to electron beam and x-ray beam instability. The invention herein is particularly helpful for bipolar x-ray tubes.

A bipolar x-ray tube 10 is illustrated in FIG. 1 with a cathode 15 and an anode 16. The cathode 15 can include an electron emitter **15*e* (e.g. filament) configured to emit electrons towards the anode 16. The anode 16 can include a target 17 configured to emit x-rays out of the x-ray tube 10 in response to impinging electrons from the cathode 15**.

A first enclosure 11 and a second enclosure 12 can be located between the cathode 15 and the anode 16. The first enclosure 11 can be located closer to the cathode 15 than the second enclosure 12. The first enclosure 11 can adjoin the cathode 15. The second enclosure 12 can be located closer to the anode 16 than the first enclosure 11. The second enclosure 12 can adjoin the anode 16. The first enclosure 11 and the second enclosure 12 can be electrically insulative and can electrically insulate the cathode 15 from the anode 16. Example materials for the first enclosure 11 and the second enclosure 12 include ceramic and glass.

A blocking disc 13 can be located between the cathode 11 and the anode 16. The blocking disc 13 can be spaced apart from and electrically insulated from the cathode 11 and the anode 16. The blocking disc 13 can be located at a junction 14 between the first enclosure 11 and the second enclosure 12. The blocking disc 13 can be located between the first enclosure 11 and the second enclosure 12. The blocking disc 13 can be encircled by the first enclosure 11.

The blocking disc 13 can be electrically conductive. The blocking disc 13 can have an aperture **13*a***.

The cathode 15 can accept a large negative voltage from a power supply. The anode 16 can accept a large positive voltage from the power supply. The blocking disc 13 can be grounded. X-ray tube 10 can be a bipolar x-ray tube.

There can be a vacuum contained within a hollow region **11*h* of the first enclosure 11, an aperture 13*a* of the blocking disc 13, and a hollow region 12*h* of the second enclosure 12**.

These hollow regions 11_h_, 13_a_, and 12_h_ can be connected and continuous. Thus, they can combine to form a single hollow region.

The hollow region 11_h_ of the first enclosure 11, the aperture 13_a_ of the blocking disc 13, and the hollow region 12_h_ of the second enclosure 12 can provide a path 19 for an electron beam from the electron emitter 15_e_ to the target 17. The path 19 can be a straight line from the electron emitter 15_e_ to the target 17. This path 19 can be entirely through hollow regions without crossing any solid material.

The blocking disc 13 can block off nearly all of the hollow region 11_h_ of the first enclosure 11 except through the aperture 13_a_ of the blocking disc 13. The blocking disc 13 can be configured to substantially block and resist x-rays, generated at the target 17, from transmitting or backscattering into the hollow region 11_h_ in the first enclosure 11, except through the aperture 13_a_. The blocking disc 13 can be made from a material with a high atomic number, and can have sufficient thickness, in order to block such x-rays. For example, the blocking disc 13 can be 4 mm thick and can be made of tungsten (e.g. ≥90 weight percent tungsten).

Although the above described x-ray tube 10 is useful, it can suffer from electron beam and x-ray beam instability. Some electrons can rebound or backscatter off of the target 17 without losing all of their energy. Some of these rebounded electrons can collect at a triple junction 12_c_ which is on the second enclosure 12, near a junction of the second enclosure 12, internal vacuum of the x-ray tube 10, and the blocking disc 13. These electrons collect at the triple junction 12_c_ due to a low electric field strength at the triple junction 12_c_. These collected electrons can cause the electron beam to shift and become unstable.

Added features in x-ray tube 20, described below, and illustrated in FIG. 2, can help to overcome this electron beam instability. X-ray tube 20 can include all of the features of x-ray tube 10. X-ray tube 20 can further comprise a field-shaping cup 22 located at least partially inside of the second enclosure 12. The path 19 for the electron beam can pass through a hole 22_h_ in a cup base 22_b_ of the field-shaping cup 22.

The field-shaping cup 22 can be electrically conductive. Therefore, the field-shaping cup 22 can provide an electrically-conductive material and path for removal of electrons that would have hit the triple junction 12_c_, thus stabilizing the electron beam.

The field-shaping cup 22 can include a cup wall 22_w_ extending from a cup base 22_b_. The cup wall 22_w_ can extend into the hollow region 12_h_ of the second enclosure 12. All or nearly all of the cup wall 22_w_ can extend into the hollow region 12_h_ of the second enclosure 12 to facilitate manufacturing of the x-ray tube. For example, ≥80%, ≥90%, or ≥95% of the cup wall 22_w_ can extend into the hollow region 12_h_ of the second enclosure 12.

The cup wall 22_w_ can cover or extend into less than half of the second enclosure 12. For example, $0.1 \leq L1/L2 \leq 0.25$, where L1 is a length of the cup wall 22_w_, and L2 is a length from the hole 22_h_ in the cup base 22_b_ to the target 17, both lengths L1 and L2 measured parallel to the path 19. This range balances competing needs of providing sufficient distance for separation of high voltages with providing sufficient protection of the triple junction 12_c_

The cup base 22_b_ can adjoin the blocking disc 13, the second enclosure 12, or both. The cup wall 22_w_ can be spaced apart from an inner surface 12_i_ of the second enclosure 12 to facilitate evacuation of air from this region and to allow easier insertion of the field-shaping cup 22 into the second enclosure 12.

The field-shaping cup 22 can be electrically-coupled to the blocking disc 13. The field-shaping cup 22 can be integral and monolithic with the blocking disc 13. It is preferable, however, for the field-shaping cup 22 to be made separately from, and made of a different material than, the blocking disc 13. Whereas the blocking disc 13 would typically be made from a very dense, high atomic number material, such as tungsten, for substantially blocking x-rays, the field-shaping cup 22 can be made of less dense materials to reduce x-ray tube weight and cost. Example materials of construction for the field-shaping cup 22 include iron, nickel, cobalt, or combinations thereof. Thus, a density of the field-shaping cup 22 can be less than a density of the blocking disc 13. Also, an element having a highest atomic number of the field-shaping cup 22 can be less than an element having a highest atomic number of the blocking disc 13.

There can be a small space, around a perimeter of blocking disc 13, between the blocking disc 13 and the first enclosure 11, to allow insertion of the blocking disc 13 inside of the first enclosure 11. Thus, the blocking disc 13 can be encircled by the first enclosure 11.

Another source of x-ray beam instability in x-ray tube 10 is electrons rebounding back into the hollow region 11_h_ of the first enclosure 11. These electrons can then be repelled by a negative voltage at the cathode 15. These repelled electrons are not focused, but rather scattered. Many of these electrons can hit the blocking disc 13 where they either generate x-rays or rebound towards the first enclosure 11.

Most of these x-rays generated in the hollow region 11_h_ of the first enclosure 11 emit in an undesirable direction. These x-rays generated in the blocking disc 13 would typically be high-energy x-rays, because the blocking disc 13 would typically include a high atomic number material, such as tungsten (Z=74). Dense material can be added around the first enclosure 11 to block these x-rays, but this material would need to be thick and dense to block these high energy x-rays. This can add considerable weight and cost to the x-ray tube.

Electrons that hit the blocking disc 13, then rebound or backscatter to the first enclosure 11, can collect at an internal surface 11_i_ of the first enclosure 11. These electrons can cause the electron beam to shift and become unstable.

An added feature in x-ray tube 30, described below, and illustrated in FIG. 3, can help to overcome this electron beam instability. The problems, of high energy x-rays generated in the hollow region 11_h_ of the first enclosure 11 and electrons collected at the internal surface 11_i_ of the first enclosure 11, can be minimized by adding a low-Z-layer 21 on a side of the blocking disc 13 that faces the electron emitter 15_e_. This low-Z-layer 21 can be sputtered, welded, or brazed on the blocking disc 13.

The low-Z-layer 21 can have a material composition that is the different from a material composition of the blocking disc 13. The low-Z-layer 21 can be made of a material that generates relatively lower energy x-rays, which are easier to block. The low-Z-layer 21 can be made of a material that backscatters a smaller percent of electrons.

Selection of a material, for the low-Z-layer 21, with a relatively low atomic number, can be helpful. For example, $Z21<Z13$, where Z21 is an atomic number of a highest atomic number element in the low-Z-layer 21 and Z13 is an atomic number of a highest atomic number element in the blocking disc 13. Here are example Z21 and Z13 values: $Z13 \geq 74$, $Z21 \leq 29$, $Z21<42$.

For example, the low-Z-layer 21 can include titanium (Z=22), carbon (Z=6), chromium (Z=24), or combinations thereof. Titanium backscatters about 35% of incident electrons, but tungsten backscatters about 50%. Furthermore, titanium (Z=22) generates lower energy x-rays than tungsten (Z=74). The low-Z-layer 21 can include iron (Z=26), cobalt (Z=27), nickel (Z=28), or combinations thereof.

The low-Z-layer 21 can achieve its intended benefit with a relatively thin layer. For example, here are example relationships between a thickness T13 of the blocking disc 13 and a thickness T21 of the low-Z-layer 21: 10≤T13/T21, 100≤T13/T21, or 500≤T13/T21; and T13/T21≤5000, T13/T21≤10,000, or T13/T21≤100,000. Both thicknesses T13 and T21 are measured parallel to the path 19.

A hole 21*h* through the low-Z-layer 21 can be aligned with the path 19 of the electron beam and can be hollow. The low-Z-layer 21 can be electrically conductive. The low-Z-layer 21 can completely cover the side of the blocking disc 13 that faces the electron emitter 15*c*.

Transmission target x-ray tubes are illustrated in FIGS. 1-4, with the target 17 mounted on an x-ray window 18. The invention herein is equally-applicable to reflection-target/side-window x-ray tubes.

As illustrated in FIG. 2, the field-shaping cup 22 can be used without the low-Z-layer 21. As illustrated in FIG. 3, the low-Z-layer 21 can be used without the field-shaping cup 22. As illustrated in FIG. 4, the field-shaping cup 22 can be combined with the low-Z-layer 21.

What is claimed is:

1. An x-ray tube comprising:
- a cathode and an anode;
- the cathode includes an electron emitter configured to emit electrons towards the anode;
- the anode includes a target configured to emit x-rays out of the x-ray tube in response to impinging electrons from the cathode;
- an electrically insulative first enclosure and an electrically insulative second enclosure located between the cathode and the anode and electrically insulating the cathode from the anode;
- the first enclosure is located closer to the cathode than the second enclosure and the second enclosure is located closer to the anode than the first enclosure;
- an electrically conductive blocking disc with an aperture located between the cathode and the anode, and spaced apart from and electrically insulated from the cathode and the anode;
- a hollow region within the first enclosure, the aperture of the blocking disc, and a hollow region within the second enclosure providing a path for an electron beam from the electron emitter to the target;
- the blocking disc configured to resist x-rays, generated at the target, from transmitting into the hollow region within the first enclosure;
- an electrically conductive, field-shaping cup extending into the hollow region of the second enclosure, the path of the electron beam passes through a hole in a cup base of the field-shaping cup;
- a low-Z-layer on a side of the blocking disc that faces the electron emitter;
- a hole through the low-Z-layer is aligned with the path for the electron beam;
- a material composition of the low-Z-layer is different from a material composition of the blocking disc; and
- Z21<Z13, where Z21 is an atomic number of a highest atomic number element in the low-Z-layer and Z13 is an atomic number of a highest atomic number element in the blocking disc.

2. The x-ray tube of claim 1, wherein the first enclosure adjoins the cathode.

3. The x-ray tube of claim 1, wherein the second enclosure adjoins the anode.

4. The x-ray tube of claim 1, wherein the hollow region contains a vacuum.

5. The x-ray tube of claim 1, wherein the blocking disc is located between the first enclosure and the second enclosure.

6. The x-ray tube of claim 1, wherein the blocking disc is encircled by the first enclosure.

7. An x-ray tube, comprising:
- a cathode and an anode;
- the cathode includes an electron emitter configured to emit electrons towards the anode;
- the anode includes a target configured to emit x-rays out of the x-ray tube in response to impinging electrons from the cathode;
- an electrically insulative first enclosure and an electrically insulative second enclosure located between the cathode and the anode and electrically insulating the cathode from the anode;
- the first enclosure is located closer to the cathode than the second enclosure and the second enclosure is located closer to the anode than the first enclosure;
- an electrically conductive blocking disc with an aperture located between the cathode and the anode, and spaced apart from and electrically insulated from the cathode and the anode;
- a hollow region within the first enclosure, the aperture of the blocking disc, and a hollow region within the second enclosure providing a path for an electron beam from the electron emitter to the target;
- the blocking disc configured to resist x-rays, generated at the target, from transmitting into the hollow region within the first enclosure; and
- an electrically conductive, field-shaping cup extending into the hollow region of the second enclosure, the path of the electron beam passes through a hole in a cup base of the field-shaping cup;
- wherein the field-shaping cup includes a cup wall extending from the cup base and 0.1≤L1/L2≤0.25, where L1 is a length of the cup wall, and L2 is a length from the hole in the cup base to the target, both lengths L1 and L2 measured parallel to the path.

8. The x-ray tube of claim 7, wherein the field-shaping cup includes iron, nickel, and cobalt.

9. The x-ray tube of claim 7, wherein the field-shaping cup is electrically-coupled to the blocking disc.

10. The x-ray tube of claim 7, wherein the cup base adjoins the blocking disc and the second enclosure.

11. An x-ray tube, comprising:
- a cathode and an anode;
- the cathode includes an electron emitter configured to emit electrons towards the anode;
- the anode includes a target configured to emit x-rays out of the x-ray tube in response to impinging electrons from the cathode;
- an electrically insulative first enclosure and an electrically insulative second enclosure located between the cathode and the anode and electrically insulating the cathode from the anode;
- the first enclosure is located closer to the cathode than the second enclosure and the second enclosure is located closer to the anode than the first enclosure;

an electrically conductive blocking disc with an aperture located between the cathode and the anode, and spaced apart from and electrically insulated from the cathode and the anode;

a hollow region within the first enclosure, the aperture of the blocking disc, and a hollow region within the second enclosure providing a path for an electron beam from the electron emitter to the target;

the blocking disc configured to resist x-rays, generated at the target, from transmitting into the hollow region within the first enclosure; and an electrically conductive, field-shaping cup extending into the hollow region of the second enclosure, the path of the electron beam passes through a hole in a cup base of the field-shaping cup;

wherein the field-shaping cup includes a cup wall extending from the cup base, and ≥80% of the cup wall extends into the hollow region of the second enclosure.

12. The x-ray tube of claim 11, wherein the cup wall is spaced apart from an inner surface of the second enclosure.

13. An x-ray tube comprising:

a cathode and an anode;

the cathode includes an electron emitter configured to emit electrons towards the anode;

the anode includes a target configured to emit x-rays out of the x-ray tube in response to impinging electrons from the cathode;

an electrically insulative first enclosure and an electrically insulative second enclosure located between the cathode and the anode and electrically insulating the cathode from the anode;

the first enclosure is located closer to the cathode than the second enclosure and the second enclosure is located closer to the anode than the first enclosure;

an electrically conductive blocking disc with an aperture located between the cathode and the anode, and spaced apart from and electrically insulated from the cathode and the anode;

a hollow region within the first enclosure, the aperture of the blocking disc, and a hollow region within the second enclosure providing a path for an electron beam from the electron emitter to the target;

the blocking disc configured to resist x-rays, generated at the target, from transmitting into the hollow region within the first enclosure;

a low-Z-layer on a side of the blocking disc that faces the electron emitter;

a hole through the low-Z-layer is aligned with the path for the electron beam;

a material composition of the low-Z-layer is different from a material composition of the blocking disc; and $Z21 < Z13$, where Z21 is an atomic number of a highest atomic number element in the low-Z-layer and Z13 is an atomic number of a highest atomic number element in the blocking disc.

14. The x-ray tube of claim 13, wherein the low-Z-layer is electrically conductive.

15. The x-ray tube of claim 13, wherein $100 \leq T13/T21 \leq 10{,}000$, where T13 is a thickness of the blocking disc and T21 is a thickness of the low-Z-layer, both thicknesses T13 and T21 measured parallel to the path.

16. The x-ray tube of claim 13, wherein the low-Z-layer completely covers a side of the blocking disc that faces the electron emitter.

17. The x-ray tube of claim 13, wherein $Z13 \geq 74$ and $Z21 \leq 29$.

18. The x-ray tube of claim 13, wherein $Z21 < 42$.

19. The x-ray tube of claim 13, wherein the low-Z-layer includes iron, nickel, and cobalt.

20. The x-ray tube of claim 11, wherein the field-shaping cup includes iron, nickel, and cobalt.

* * * * *